May 21, 1963 G. A. SWARTZ 3,090,737
PLASMA HEATING APPARATUS AND PROCESS
Filed Feb. 24, 1960

INVENTOR.
GEORGE A. SWARTZ
BY
ATTORNEY

United States Patent Office 3,090,737
Patented May 21, 1963

3,090,737
PLASMA HEATING APPARATUS AND PROCESS
George A. Swartz, Princeton Junction, N.J., assignor to Radio Corporation of America, a corporation of Delaware
Filed Feb. 24, 1960, Ser. No. 10,690
14 Claims. (Cl. 204—154.2)

This invention relates to heating methods and apparatus and more particularly to improved methods of and apparatus for heating a gaseous plasma to high temperatures.

Several research devices have been devised for studying effects in and properties of high temperature plasmas and for production of thermonuclear reactions. In such devices, it is necessary that the plasma be elevated to a high temperature while at the same time, the plasma must be thermally isolated from the walls of any chamber employed to house the plasma. The plasmas studied in such devices generally comprise deuterium or tritium or mixtures of the two.

Plasma confinement may be accomplished in a so called "magnetic bottle." When a heavy current is caused to flow through a plasma it results in magnetic lines of force which surround and effectively pinch the plasma. In another instance, coils surround the plasma and an electric current passing through the coils generates a strong axial magnetic field. The plasma particles orbit around the magnetic field lines and are effectively confined in a column. The confining fields, in many instances, must be very intense having densities of the order 20,000 to 50,000 gauss.

Plasma heating may be accomplished by "magnetic pumping" wherein the magnetic field is caused to pulsate and produce, by induction, an electric field in the plasma transverse to the magnetic field. When the magnetic field is caused to pulsate at a frequency close to the ion cyclotron frequency, this heating method is called "ion cyclotron resonance heating." This method of heating is described by T. H. Stix and R. W. Palladino in the Proceedings of the Second United Nations Conference on the Peaceful Uses of Atomic Energy, September 1 to 13, 1958, volume 12.

The desirability of heating a magnetically confined plasma with an externally applied electric field has been recognized heretofore. However, a plasma shields itself so effectively that no appreciable penetration of such a field into the plasma has been possible. Upon application of an electric field to a plasma, which field is alternating or rotating at or near ion cyclotron resonance, separation of charges occurs. Ions, in the plasma, are radially attracted to the negative region of the electric field whereas electrons, which are tightly bound to the magnetic field lines, are incapable of radial movement. This separation of charges results in creation of positive space charge in the region to which ions are attracted and in effective shielding of the plasma from the externally applied electric field. Thus, an externally applied field transfers negligible energy to the ions and little heating thereof is produced.

A general object of this invention is to provide improved methods and means for heating gaseous plasmas.

Another object is to provide improved methods and means for overcoming shielding effects in gaseous plasma during the heating thereof.

A still further object is to provide improved methods and means for generating electric fields and to cause them to penetrate a gaseous plasma to promote heating thereof.

An additional object is to provide improved methods and means for generating alternating electric fields of different frequencies for heating a gaseous plasma having at least two different ion cyclotron resonance frequencies.

Briefly, the foregoing and other objects and advantages are accomplished in accordance with typical embodiments of the invention by heating a plasma, confined in a magnetic bottle, by generating axially adjacent alternating or rotating electric fields normal to the axial magnetic field of the magnetic bottle. At least two electric fields, transverse to the magnetic field, are generated having a frequency the same as, or about the same as, an ion cyclotron frequency of the plasma. Axially adjacent fields are caused to alternate or rotate at the same frequency but at a phase difference of about 180°.

By employing at least two axially adjacent transverse electric fields having a phase difference of 180°, plasma shielding is overcome. This result is achieved by taking advantage of the fact that, while the electrons of the plasma are incapable of radial movement in the magnetic field, they can be moved along the magnetic field lines in an axial direction. In each of the transverse electric fields, ions are moved radially to the negative portion of the fields leaving an excess of electrons in the positive portion of each field. These electrons feel the positive space charge created by the ions in the adjacent field and are axially attracted thereto. The axial movement of electrons results in neturalization of the positive space charge and permits penetration of the externally applied fields into the plasma to promote heating of the ions therein.

In a preferred embodiment of this invention, an electrode structure is provided which produces rotating electric fields. Such a structure comprises at least two axially spaced sets of electrodes, each set comprising a plurality of and preferably four or more electrodes radially spaced about a column of plasma. When each set comprises four electrodes, circular polarization of an electric field is accomplished by feeding RF (radio frequency) energy directly to one pair of opposed electrodes and by feeding the same RF energy through a ¼ wave delay structure to the other pair of opposed electrodes in any one set. An axially adjacent set of electrodes is fed, in the same manner, with RF energy of the same frequency but at a phase difference of 180° with respect to the first set.

The invention and other objects and advantages thereof will be described in greater detail by reference to the accompanying drawing in which.

In the drawing, similar elements are identified by similar reference characters.

Figure 1:
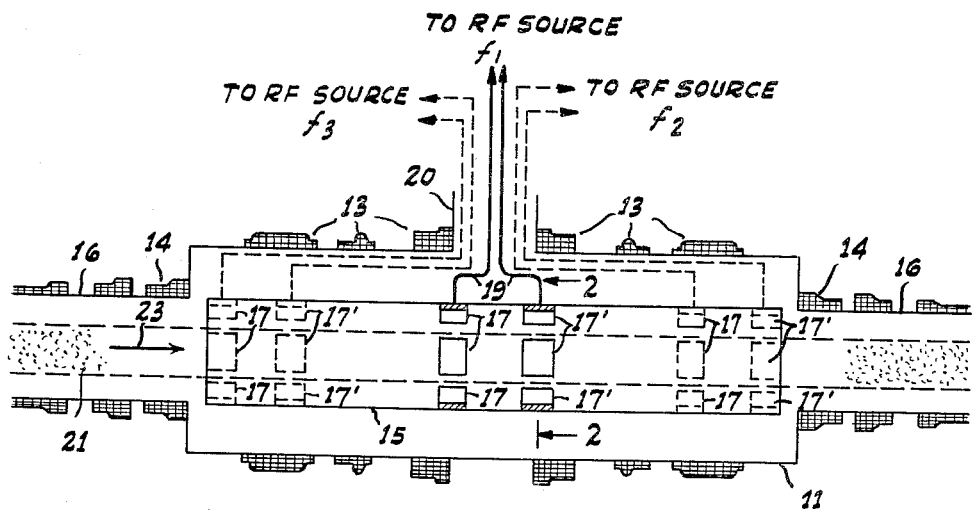
FIGURE 1 is a partially schematic sectional view of a resonance box for producing a magnetic bottle and incorporating the electrode structure of a preferred embodiment of this invention.

The resonance box shown in FIG. 1 is patterned after the type employed in a typical stellarator, such as described in the Stix et al. publication, op. cit. The elements of the box include, for example, a non-magnetic cylindrical housing 11 slightly over 21 inches in length. Surrounding the housing 11 are a plurality of magnetic field producing windings 13. Within the housing 11 there is mounted a ceramic tube 15, 21 inches long and 4 inches in diameter which defines a plasma reaction zone. The windings 13 are designed to produce a uniform confining field over a length of about 18 inches. Additional windings 14 are provided at each end of the ceramic tube 15 to produce mirror fields of a 3–2 mirror ratio at each end of the ceramic tube 15. In a stellarator, the resonance box of FIG. 1 is coupled into an endless toroid or race track (not shown), plasma being injected into and withdrawn from the resonance box via 4 inch diameter tubular sections 16 connected to either end of the resonance box.

In accordance with a preferred embodiment of the present invention a plurality of electric field generating means are mounted within the ceramic tube 15. Each means comprises a plurality of arcuate electrodes 17 and 17' equally spaced around the inner surface of the ceramic tube 15. RF energy is fed to the electrodes by means of leads 19, which may be, for example, conventional coaxial transmission lines, passing through one or more vacuum sealed entry ports 20 in the housing 11.

During operation the confining field windings 13 are energized to produce a strong axial magnetic field of the order of 20,000 to 50,000 gauss. A column of plasma 21 is then injected into the ceramic tube 15 in the direction shown by the arrow 23. This may be accomplished, for example, in the manner set forth in U.S. Patent 2,910,414 to Lyman Spitzer, Jr. Preferably the plasma 21 is as fully ionized as possible, the plasma may comprise, for example, deuterium or tritium ions, or mixtures thereof, and electrons separately orbiting about the magnetic lines of force in a helical path.

Figure 2:
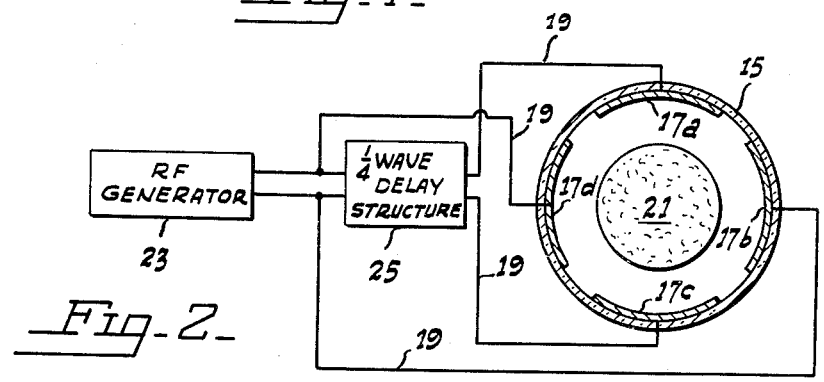
FIGURE 2 is a partially schematic cross-sectional view along the line 2—2 of FIG. 1 and includes a schematic circuit diagram showing one method of feeding RF energy to the electrode structure of FIG. 1.

As shown in FIG. 2 the plasma 21 is confined by the magnetic field in a compact column isolated from the inner surface of the ceramic tube 15 and the electrodes 17. Also depicted in FIG. 2 is a circuit for feeding RF energy to one set of electrodes 17. For convenience, electrodes 17 and 17' are respectively numbered 17a, 17b, 17c, 17d, and 17a', 17b', 17c', 17d' in FIGS. 2 and 3. One pair of oppositely disposed electrodes 17b and 17d are fed 180° out of phase directly from an RF generator 23. In the same manner, RF energy is applied to the other pair of electrodes 17a and 17c but since they are fed from the generator 23 through a conventional ¼ wave delay structure 25, each electrode is fed 90° out of phase with respect to the next adjacent electrode. In this manner, a circularly polarized electric field is established within the ceramic tube 15.

Power requirements for creating the circularly polarized fields may range as high as 200 kw. Suitable RF generators are described in "Induction and Dielectric Heating," by J. W. Cable, 1954, Rheinhold Publishing Co., New York, N.Y. Suitable delay structures are described in "Principles and Applications of Waveguide Transmission," by G. C. Southworth, 1950, Van Nostrand Co., Princeton, N.J., and in "An Adjustable Waveguide Phase Changer," by A. J. Fox, Proceedings of the I.R.E., December 1947, volume 35, Number 12.

Figure 3:
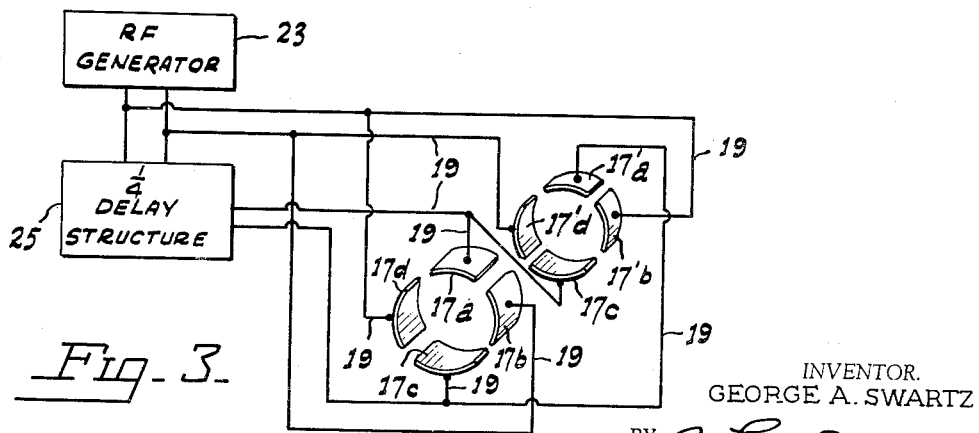
FIGURE 3 is schematic prespective view illustrating two sets of adjacent electrode structures of FIG. 1 and an RF circuit for feeding RF energy of appropriate frequency and phase to the electrode structures.

In FIG. 3, two sets of electrodes 17 and 17' are shown connected to the RF generator 23 and to the ¼ wave delay structure 25. The first set of electrodes 17a–17d are fed with RF energy as described heretofore so that the potential on adjacent electrodes 90° out of phase to establish a circularly polarized electric field. The next axially adjacent set of electrodes 17a'–17d' are fed in the same manner, however the instantaneous potential on each electrode 17a'–17d' is caused to be 180° out of phase with the corresponding electrode of the first set of electrodes 17a–17d.

In the device of FIGS. 2 and 3, plasma heating can be accomplished employing only one pair of opposed electrodes such as, for example, 17a and 17c and 17a' and 17c' in each set thereof. However, the efficiency of such an arrangement will not be as great as when the four electrode configuration shown is employed to provide rotating fields. With only two opposed electrodes in each set producing an oscillating RF field, ions can only be accelerated once during each half cycle of the field. The more efficient rotating fields produced by four or more electrodes results in more continuous acceleration of the ions.

Instead of two pairs of opposed electrodes 17 or 17' three or more opposed pairs may be employed. If three opposed pairs are employed, the individual electrodes are preferably evenly spaced around the interior of the ceramic tube 15 at intervals of 60°. With four pairs, the interval is preferably 45°. In such instances, adjacent electrodes are fed with RF energy at a phase difference of 60° and 45° respectively by means of appropriate delay lines.

The spacing between electrodes 17 and 17' in any one set and the spacing between sets is not critical. In a resonance box such as that shown in FIG. 1, the electrodes 17a–17d of each set might be spaced about 1 inch apart and adjacent sets of electrodes 17 and 17' four or more inches apart. Adjacent sets of electrodes are axially spaced apart a distance sufficient to prevent electric fields from being produced between corresponding electrodes of adjacent sets rather than in the required transverse direction between opposed pairs of a single set. Although, under some conditions of operation, the sets of electrodes could be spaced quite closely together, a spacing equal to or in excess of the diameter of the ceramic tube 15 will usually satisfy all conditions of operation.

The shape and size of the electrodes are also not critical. Instead of the arcuate shape illustrated in the figures each electrode 17 or 17' might comprise a flat rectangle. In the resonance box of FIG. 1, electrode dimensions for a four electrode configuration conveniently include an arcuate length of two inches and an axial length of one inch. All dimensions set forth are to be considered as examples only, actual dimensions will to a large extent, depend on the purpose for which a resonance box is designed.

As mentioned heretofore, the resonance box of FIG. 1 is patterned after the type employed in a stellarator. Thus, except as set forth hereinafter, operation of the resonance box will normally be the same as is described by Stix and Palladino, op. cit.

With one set of electrodes, FIG. 3, energized as described heretofore a circularly polarized electric field is generated transverse to the axis of the column of plasma. If only the one set is energized, the radial field is incapable of penetrating the plasma because of the shielding effect described earlier. When two adjacent sets of electrodes 17 and 17' are energized producing two radial fields 180° out of phase with respect to each other, the shielding effect is overcome. This results from the differential in attraction of electrons and ions in electric fields. For example, if only one set of electrodes 17 were energized and the uppermost 17a of the electrodes 17 is negative, positive ions will be attracted thereto. Since the electrons in the plasma are tightly bound to the magnetic lines of force of the confining field, they are incapable of radial movement. Thus, when the uppermost 17a of the electrodes 17 is negative, the attracted ions create a positive space charge in the plasma adjacent to that electrode and the plasma is effectively shielded. By simultaneously energizing two sets of electrodes 17 and 17', the shielding effect is overcome. This is accomplished by taking advantage of the fact that, while electrons cannot be moved radially, they can be moved in an axial direction. When the uppermost electrode 17a' of the second set of electrodes 17' positive, an excess of electrons is created in the plasma adjacent to this electrode 17a'. These electrons are attracted by the positive space charge created near the uppermost electrode 17a of the first set of electrodes 17. Upon reaching the positive space charge region of the plasma the electrons neutralize that charge and permit the externally applied electric field to penetrate the plasma and transfer energy to the ions therein.

The frequency of the RF energy applied to the electrodes 17 and 17' will depend on what type of ions in the gaseous plasma are to be heated and upon the intensity of the magnetic confining field. For example, when deuterium ions are to be heated and the confining field has an intensity of 20,000 gauss, the cyclotron resonance frequency is 15 mc. Hence, RF energy at about the same frequency will be applied to the electrodes. If the field intensity is 50,000 gauss a frequency of about 37.5 mc. will be employed. The frequency with respect to tritium at 20,000 gauss will be about 10 mc. and at 50,000 gauss will be about 25 mc.

As shown in dotted outline in FIG. 1, a plurality of heating stages each comprising two sets of electrodes, may be included in the ceramic tube. The plurality of heating stages may all be operated at the same frequency or, if desired, each two sets of electrodes can be operated at a different frequency (designated $f1$, $f2$ and $f3$ in FIG. 3) with a separate RF generator and delay structure for each two sets of electrodes. Thus, if a plasma comprised of a mixture of deuterium and tritium is to be heated, one two set stage can be operated at the deuterium resonance frequency and another two set stage at the tritium resonance frequency, thereby providing for maximized heating of all the ions in the plasma.

What is claimed is:

1. In a method of heating a gaseous plasma radially confined in a reaction zone by a unidirectional magnetic field parallel to the axis of said zone; the improvement in said method comprising: applying a first varying electric field to said plasma transverse to said reaction zone, and applying a second substantially oppositely phased varying electric field to said plasma transverse to said reaction zone and axially displaced from said first electric field, each of said electric fields having a frequency substantially equal to a cyclotron resonance frequency of said plasma.

2. In a method of heating a gaseous plasma radially confined in a reaction zone by a unidirectional magnetic field parallel to the axis of said zone; the improvement in said method comprising: applying a first circularly polarized electric field to said plasma transverse to said reaction zone and applying a second substantially oppositely phase circularly polarized electric field to said plasma transverse to said reaction zone and axially displaced from said first electric field, both said electric fields rotating in the same sense as the ions in said plasma and at a frequency substantially equal to a cyclotron resonance frequency of said plasma.

3. In a method of heating a gaseous plasma confined in a substantially cylindrical reaction zone by a unidirectional magnetic field parallel to the axis of said zone; the improvement comprising: establishing at least three varying electric fields axially displaced from one another and transverse to said reaction zone, said electric fields varying at a frequency substantially equal to an ion cyclotron frequency of said plasma, alternate ones of said electric fields being substantially oppositely phased with respect to adjacent ones of said fields.

4. In a method of heating a gaseous plasma confined in a substantially cylindrical reaction zone by a unidirectional magnetic field parallel to the axis of said zone; the improvement comprising: establishing at least three circularly polarized electric fields axially displaced from one another and transverse to said reaction zone, said electric fields rotating in the same sense as the ions in said plasma and at a frequency substantially equal to an ion cyclotron resonance frequency of said plasma, alternate ones of said electric fields being substantially oppositely phased with respect to adjacent ones of said fields.

5. In a method of heating a gaseous plasma wherein the plasma contains different types of ions having different cyclotron resonance frequencies, said method including confining said plasma in a substantially cylindrical reaction zone by a unidirectional magnetic field parallel to the axis of said zone; the improvement comprising: establishing a plurality of pairs of substantially oppositely phased varying electric fields, said electric fields being axially displaced from one another and transverse to said reaction zone, at least one pair of electric fields having a frequency substantially equal to the cyclotron resonance frequency of one type of ion in said plasma, and at least another pair of electric fields having a frequency substantially equal to the cyclotron resonance frequency of a different type of ion in said plasma.

6. In a method of heating a gaseous plasma wherein said plasma contains different types of ions having different cyclotron resonance frequencies, said method including confining said plasma in a substantially cylindrical reaction zone by a unidirectional magnetic field parallel to the axis of said reaction zone; the improvement comprising: establishing a plurality of pairs of circularly polarized substantially oppositely phased electric fields, said electric fields being axially displaced from one another and transverse to said reaction zone and having the same sense of rotation as the ions in said plasma, at least one pair of electric fields rotating at a frequency substantially equal to the cyclotron resonance frequency of one type of ion in said plasma, and at least another of said pairs of electric fields rotating at a frequency substantially equal to the cyclotron resonance frequency of another type of ion in said plasma.

7. Apparatus for heating a plasma radially confined in a reaction zone by a coaxial magnetic field, said plasma having an ion cyclotron resonance frequency, said apparatus comprising means for establishing a first varying electric field normal to and through the axis of said zone and having a frequency substantially equal to said resonance frequency and means for establishing a second substantially oppositely phased varying electric field normal to and through the axis of said zone and axially displaced from said first varying electric field, said second electric field varying at the same frequency as said first electric field.

8. Apparatus for heating a plasma confined in a column by a coaxial magnetic field, said plasma having an ion cyclotron resonance frequency; said apparatus comprising means for establishing a first electric field normal to and through the axis of said column, means for rotating said electric field at a frequency substantially equal to said resonance frequency, means for establishing a second electric field normal to and through the axis of said column and axially displaced from said first electric field, and means for rotating said second electric field at the same frequency as but with substantially opposite phase with respect to said first electric field.

9. In apparatus for heating a gaseous plasma confined in a column by a coaxial magnetic field, said plasma having an ion cyclotron resonance frequency, the combination of first electrode means for establishing a varying electric field transverse to said column, second electrode means axially displaced from said first electrode means for establishing a second varying electric field transverse to said column, connection means for applying to said first electrode means a first alternating potential having a frequency substantially equal to said ion cyclotron resonance frequency and connection means for applying to said second electrode means a second substantially oppositely phased alternating potential having a frequency the same as said first potential.

10. In apparatus for heating a gaseous plasma confined in a column by a coaxial magnetic field, said plasma having an ion cyclotron resonance frequency; the combination of: at least three axially displaced sets of electrodes, each said set comprising a plurality of oppositely disposed electrodes angularly spaced about said plasma column, means for applying an alternating potential to the electrodes of each set in a phase relationship to produce circularly polarized transverse electric fields rotating in the same sense as the ions in said plasma and at about said resonance frequency, and means for producing substantially opposite phase between adjacent electric fields.

11. In apparatus for heating a gaseous plasma confined in a column by a coaxial magnetic field, said plasma having at least two ion cylclotron resonance frequencies; the combination of: a plurality of pairs of means for establishing axially displaced varying electric fields, means for applying alternating potential of different frequencies to different pairs of said means to produce a plurality of pairs of said electric fields transverse to said column, one of said pairs of fields having a frequency about equal to one of said resonance frequencies and at least another of said pairs of fields having a frequency about equal to another of said resonance frequencies, and means for substantially oppositely phasing the two electric fields of each of said pairs of electric fields.

12. In apparatus for heating a gaseous plasma confined in a column by a coaxial magnetic field, said plasma having at least two ion cyclotron resonance frequencies; the combination of: a plurality of pairs of means for establishing axially displaced circularly polarized electric fields, means for applying alternating potential of different frequencies to different pairs of said means to produce a plurality of pairs of said electric fields transverse to said column, one of said pairs of fields rotating at a frequency substantially equal to one of said resonance frequencies and at least another of said pairs of fields rotating at a frequency substantially equal to another of said resonance frequencies, all of said fields rotating in the same sense as the ions in said plasma; and means for substantially oppositely phasing the two electric fields of each of said pairs of electric fields.

13. In apparatus for heating a gaseous plasma confined in a column by a coaxial magnetic field, said plasma having at least two ion cyclotron resonance frequencies; the combination of: a plurality of pairs of sets of electrodes for establishing axially displaced varying electric fields transverse to said column, means for applying different frequency alternating potential to each of said pairs of electrodes to produce said electric fields, one of said pairs of fields having a frequency substantially equal to one of said resonance frequencies and at least another of said pairs of fields having a frequency substantially equal to another of said resonance frequencies; and means for substantially oppositely phasing the two electric fields of each of said pairs of fields.

14. In apparatus for heating a gaseous plasma confined in a column by a coaxial magnetic field, said plasma having at least two ion cyclotron resonance frequencies; the combination of a plurality of pairs of sets of electrodes for producing axially displaced circularly polarized electric fields transverse to said column, means for applying different frequencies to at least two of said plurality of pairs to produce a plurality of pairs of said electric fields, one of said pairs of fields rotating at a frequency substantially equal to one of said resonance frequencies and at least another of said pairs of fields rotating at a frequency substantially equal to another of said resonance frequencies, all of said fields rotating in the same sense as the ions in said plasma; and means for substantially oppositely phasing the two electric fields of each of said pairs of electric fields.

References Cited in the file of this patent

UNITED STATES PATENTS

| | | |
|---|---|---|
| 2,415,025 | Grell et al. | Jan. 28, 1947 |
| 2,582,806 | Nes et al. | Jan. 15, 1952 |
| 2,946,914 | Colgate | July 26, 1960 |
| 2,961,558 | Luce | Nov. 22, 1960 |

OTHER REFERENCES

Proceedings of the Second United Nations International Conference on the Peaceful Uses of Atomic Energy, vol. 31, United Nations, 1958, pp. 282–287; vol. 32 of above, pp. 239, 244, 181–196.